United States Patent [19]

Yamaguchi

[11] Patent Number: 5,029,126

[45] Date of Patent: Jul. 2, 1991

[54] CACHE MEMORY

[75] Inventor: Seiji Yamaguchi, Hirakata, Japan

[73] Assignee: Matsushita Electric Industrial Co., Ltd., Osaka, Japan

[21] Appl. No.: 388,938

[22] Filed: Aug. 3, 1989

[30] Foreign Application Priority Data

Aug. 9, 1988 [JP] Japan .................................. 63-198209

[51] Int. Cl.⁵ ...................... G11C 11/40; G11C 15/00
[52] U.S. Cl. ........................................ 365/49; 365/227
[58] Field of Search ...................... 365/49, 189.01, 227

[56] References Cited

U.S. PATENT DOCUMENTS

| 4,106,058 | 8/1978 | Romeas et al. | |
|---|---|---|---|
| 4,332,022 | 5/1982 | Ceshkovsky et al. | |
| 4,580,240 | 4/1986 | Watanabe | 365/49 |
| 4,646,271 | 2/1987 | Uchiyama et al. | 365/49 |

Primary Examiner—Terrell W. Fears
Attorney, Agent, or Firm—Stevens, Davis, Miller & Mosher

[57] ABSTRACT

A set associative type cache memory incorporated in a microprocessor includes memory arrays arranged in a group for each line, and only a memory array selected by a line address selected at the time of operation is made operative, thus reducing power consumption.

3 Claims, 1 Drawing Sheet

CACHE MEMORY

BACKGROUND OF THE INVENTION

The present invention relates to a cache memory which may be utilized in a microprocessor having a large capacity cache memory.

In order to enhance the performance of a microprocessor, 1) the development of micro-lithography, 2) the incorporation of a large capacity cache memory, 3) the adoption of parallel processing, and 4) the advancement of circuit technology are required. Among others, the incorporation of a large capacity cache memory is very effective in enhancing the performance of a microprocessor, since it can reduce the number of times of accessing a main memory by the microprocessor.

The cache memory, which is incorporated in a microprocessor, has three types, a direct map type, a set associative type and a full associative type.

The cache memory stores therein a high order bit of an address called a tag address and data at every block, and an address sent from a CPU is compared with the tag address. If they coincide with each other, it is called a cache hit, and, if they do not coincide with each other, it is called a cache miss. Where one comparator is used to make the addresses comparison, it is called a direct map type. If a plurality of comparators are used, it is called a set associative type, and, if a comparator is provided for every block, it is called a full associative type.

Where a cache memory is incorporated in a microprocessor (to realize high performance on a silicon chip with a limited chip area), the set associative type is usually adopted.

A microprocessor which contains a large capacity cache memory of the set associative type has been announced by Intel Corp. (L. Kohn and S. Fu, "A 1,000,000 Transistor Microprocessor", Proceedings of IEEE ISSCC '89).

In the set associative type, accessing operations are conducted in all sets. Accordingly, charging and discharging are effected on all bit lines and hence power consumption becomes great.

In a microprocessor which contains a large capacity cache memory, the integrated elements involved are very large in number and the operation speed thereof is high, which causes an increase in power consumption. As the power consumption increases, the temperature of a package and semiconductor chips rises, which causes degradation of performance characteristics and reliability of the integrated elements. As a result, it becomes necessary to employ a packaging system which uses forced cooling, etc. This eventually increases its manufacturing cost.

In the layout design of the set associative type having an odd number of sets, the number of blocks of a memory array area becomes odd. As a result, wastage of space is apt to appear in the wiring design, etc. A chip area of a large scale results in a decrease in manufacturing yield.

SUMMARY OF THE INVENTION

It is an object of the present invention to provide a cache memory which can reduce power consumption in a large capacity cache memory of the set associative type which is incorporated in a microprocessor and which can reduce space wastage by dividing a memory array into an even number of sets, since an odd number of sets results in space wastage in the layout design.

In the cache memory of the present invention, the set associative type having m sets (m is an integer and m > 1) is adopted. The cache memory comprises n lines (n is a power of two and n $\geq$ 1) per block and n memory array areas in each of which one word is formed of m $\times$ k bits, where k is the number of bits in one per line, block and set.

In accordance with the structure of the cache memory of the present invention, a memory array area, which is made operative when the cache memory is accessed, is limited to only one by an address which selects an offset address line. Accordingly, the present invention is very effective in reducing power consumption.

Even in the case of a cache memory having an odd number of sets, since the memory array is composed for every line and this makes it possible to use the memory array as an even number of memory array areas, the layout design and the floor plan of a semiconductor integrated circuit to be used therein can be made easy and a chip space can be effectively utilized.

DETAILED DESCRIPTION OF THE PREFERRED EMBODIMENTS

Figure 1:
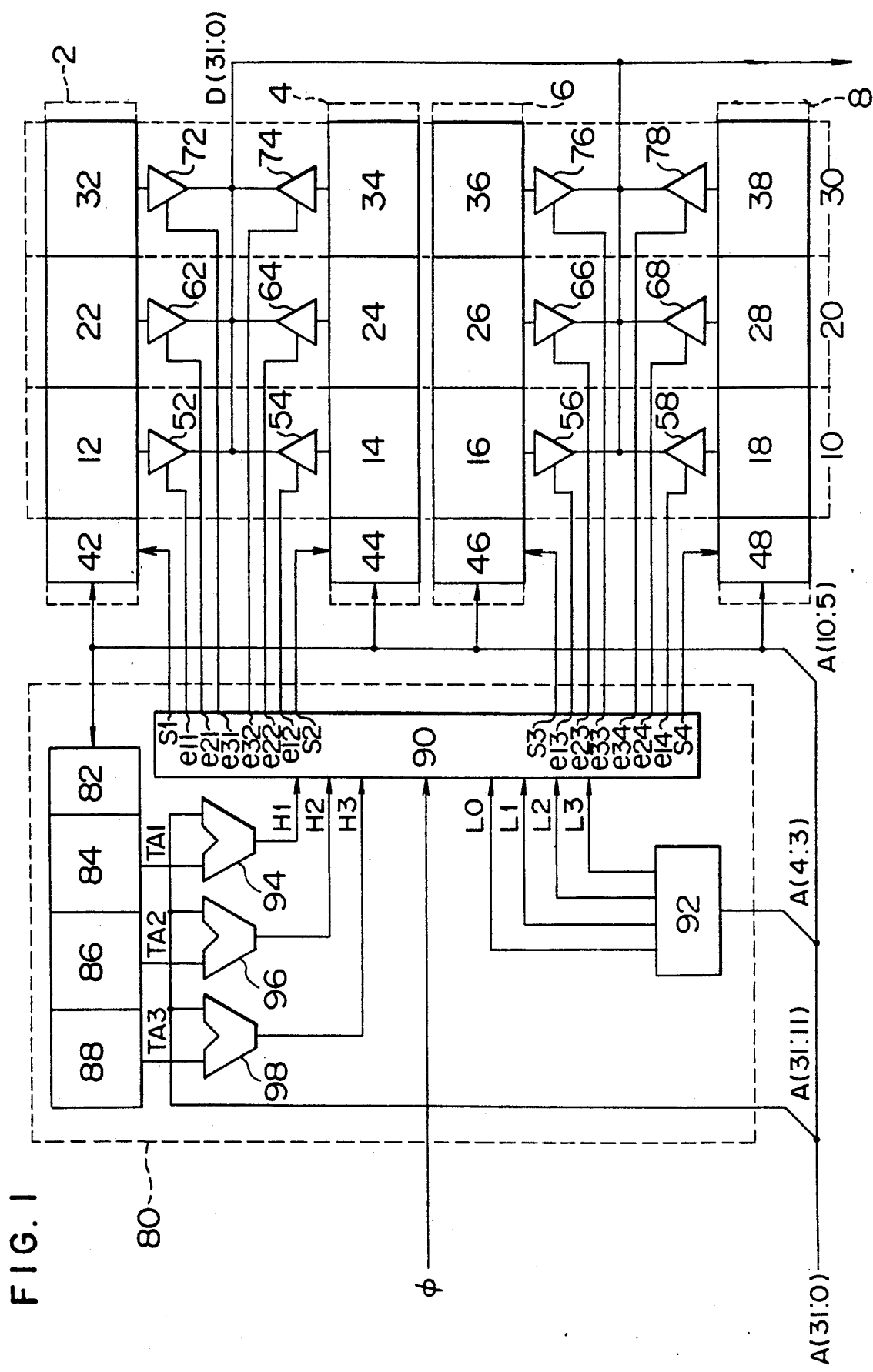
FIG. 1 is a block diagram showing one embodiment of the cache memory of the present invention.

FIG. 1 is a block diagram showing a cache memory of one embodiment of the present invention. FIG. 1 shows a cache memory wherein m=3 sets, n=4 lines, k=32 bits and l=64 blocks and which operates in synchronism with a clock $\phi$.

In FIG. 1, numerals 2, 4, 6 and 8 denote 192$\times$32 bits memory array areas, numerals 12, 14, 16 and 18 denote 64$\times$32 bits memory areas which store therein a first set of data, numerals 22, 24, 26 and 28 denote 64$\times$32 bits memory areas which store therein a second set of data, numerals 32, 34, 36 and 38 denote 64$\times$32 bits memory areas which store therein a third set of data, numerals 42, 44, 46, and 48 denote row decoders (6-bit decoders of address A [10:5]) of the memory array areas, numerals 52, 54, 56 and 58 denote output buffers of the first set, numerals 62, 64, 66 and 68 denote output buffers of the second set, numerals 72, 74, 76 and 78 denote output buffers of the third set, numeral 80 denotes a control circuit of a tag memory area and an operation state of the cache memory, numeral 82 denotes a row decoder of the tag memory area, numeral 84 denotes a memory area of the tag address of the first set, numeral 86 denotes a memory area of the tag address of the second set, numeral 88 denotes a memory area of the tag address of the third set, numeral 94 denotes a comparator of the first set, numeral 96 denotes a comparator of the second set, numeral 98 denotes a comparator of the third set, numeral 92 denotes a 2-bit decoder of address A [4:3], and numeral 90 denotes an operation state control circuit. Each of the memory array areas 2, 4, 6 and 8 is composed in one unit for every line (selected by the address A [4:3]).

A 32-bit address A [31:0] produced by a CPU (not shown) is divided and used in the cache memory as shown below.

A [31:11]: Address to be compared with tag address of the cache memory,

A [10:5]: Address for selecting a block in the cache memory, and

A [4:3]: Address for selecting a line in the cache memory.

When the cache memory of the set associative type is accessed, the CPU transfers a produced address A [31:0]to the cache memory. The six bits of the address A [10:5]provide an address for selecting a block in cache memory and they are supplied to the row decoders 42, 44, 46 and 48 of the respective memory array areas and the row decoder 82 of the tag address to select one of the 64 blocks. On the other hand, the two bits of the address A [4:3]provide an address for selecting a line in the cache memory and they are supplied to the 2-bit decoder 92 which selects one of line addresses L0, L1, L2 and L3 to be made operative. The line addresses L0, L1, L2 and L3 are supplied to the operation state control circuit 90, when they are ANDed with the clock $\phi$ to generate control signals S1, S2, S3 and S4 for selecting one of the memory array areas to be made operative. When a line is selected by the address A [4:3]and a block to be selected by the row decoders 42, 44, 46 and 48 of the memory array areas and the row decoder 82 of the tag address is determined by the address A [10:5], the selection of a line is made by the control signals S1, S2, S3 and S4. Thus, it is possible to decide which one of the four memory arrays should be made operative. Only a memory array area, whose bit lines are to be charged and discharged, is made operative by the control signals S1, S2, S3 and S4, and, in the other memory array areas, the bit lines are maintained in the respective charged states.

In this manner, the reduction in power consumption is accomplished.

High order 21 bits of the address A [31:11] are compared with tag addresses TA1, TA2 and TA3, which are read out respectively from the memory areas 84, 86 and 88 of the tag addresses of the cache memory, in the comparators 94, 96 and 98 to check whether there is any coincident set or not. The comparators 94, 96 and 98 produce respective comparison output signals H1, H2 and H3. If there is a coincident set, the comparison output signal for that set is rendered to be high.

The operation state control circuit 90 inputs the line addresses L0, L1, L2 and L3 and the comparison output signals H1, H2 and H3, and makes an AND operation between the line addresses and the comparison output signals to thereby produce control signals e11, e12, e13, e14, e21, e22, e23, e24, e31, e32, e33 and e34. The control signals e11 to e34 enable the output buffers to read the data of a line, when there is a set of a coincident tag address and when the line is operative, and to output the read-out data onto the data bus D [31:0].

From the viewpoint of the layout design of the semiconductor integrated circuit, the case of having an even number of memory array areas has advantages over the case of having an odd number of memory array areas in that the former case is easier in the layout design, and, at the same time, it allows common use of data buses, and, as a result, gives rise to less space wastage.

In accordance with the present invention, in the cache memory of the set associative type which is incorporated in a microprocessor, only one of n memory array areas (n is a power of two) is made operative at the access time. Accordingly, power consumption can be reduced very effectively.

Further, since a cache memory having an odd number of memory array areas can be used as if it were a cache memory having an even number of memory areas, the layout design and the floor plan of a semiconductor integrated circuit are facilitated, and, at the same time, chip space can be effectively utilized.

What is claimed is:

1. A cache memory of a set associative type incorporated in a semiconductor integrated circuit, wherein the number of sets, which indicates a number of data pieces which can be read out during a single access operation to said cache memory, is represented by m (where m is an integer and is greater than 1), the number of blocks, which indicates a number of accessible tag addresses contained in one set, is represented by l (where l is a power of 2), the number of lines, which indicates a number of accessible addresses contained in one block is represented by n (where n is a power of 2 and is greater than 1), and the number of data bits per line, block and set is represented by k (where k is an integer), said cache memory comprising:

n memory array areas, each of said memory array areas containing l x m x k bits; and data buses connected respectively to said memory array areas to receive and transfer data, each of said data buses being of k bits, wherein said memory array areas are grouped into a plurality of pairs, and respective sets of each pair of said memory array areas are arranged symmetrically with respect to a respective one of said data buses so that the respective sets of each pair of said memory array areas are connected in common to said respective one of said data buses.

2. A cache memory of a set associative type incorporated in a semiconductor integrated circuit, wherein the number of sets, which indicates a number of data pieces which can be read out during a single access operation to said cache memory, is represented by m (where m is an integer and is greater than 1), the number of blocks, which indicates a number of accessible tag addresses contained in one set, is represented by l (where l is a power of 2), the number of lines, which indicates a number of accessible addresses contained in one block is represented by n (where n is power of 2 and is greater than 1), and the number of data bits per line, block and set is represented by k (where k is an integer), said cache memory comprising:

n memory array areas, each of said memory array areas containing l x m x k bits; and data buses connected respectively to said memory array areas to receive and transfer data, each of said data buses being of k bits, wherein said memory array areas are grouped into a plurality of pairs, and respective sets of each pair of said memory array areas are arranged symmetrically with respect to a respective one of said data buses so that the respective sets of each pair of said memory array areas are connected in common to said respective one of said data buses, and only one of said n memory array areas, which is selected by a line address, is caused to be operative when said cache memory is in operation, while the remaining (n-1) memory array areas are maintained in an inoperative condition.

3. A cache memory according to claim 1, wherein m is an odd number greater than 1.

* * * * *

UNITED STATES PATENT AND TRADEMARK OFFICE
CERTIFICATE OF CORRECTION

PATENT NO. : 5,029,126
DATED : July 2, 1991
INVENTOR(S) : Seiji YAMAGUCHI

It is certified that error appears in the above-indentified patent and that said Letters Patent is hereby corrected as shown below:

Column 4, line 19, claim 1, change "than 1" to --than one--.

line 45, claim 2, change "than 1" to --than one--.

Signed and Sealed this

Third Day of September, 1996

Attest:

BRUCE LEHMAN

Attesting Officer          Commissioner of Patents and Trademarks